US008219646B2

(12) United States Patent
Hahn et al.

(10) Patent No.: US 8,219,646 B2
(45) Date of Patent: Jul. 10, 2012

(54) DYNAMIC INTELLIGENT MIRROR HOST SELECTION

(75) Inventors: Stephen Charles Hahn, Redwood City, CA (US); Krister McDermott Johansen, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 172 days.

(21) Appl. No.: 12/751,580

(22) Filed: Mar. 31, 2010

(65) Prior Publication Data

US 2011/0246615 A1 Oct. 6, 2011

(51) Int. Cl.
*G06F 15/16* (2006.01)

(52) U.S. Cl. ........ 709/219; 709/203; 709/224; 709/238; 718/105

(58) Field of Classification Search .................. 709/203, 709/217, 219, 223–224, 238; 718/105
See application file for complete search history.

(56) References Cited

U.S. PATENT DOCUMENTS

| | | | | |
|---|---|---|---|---|
| 6,185,619 B1 * | 2/2001 | Joffe et al. | ..................... | 709/229 |
| 7,089,301 B1 * | 8/2006 | Labio et al. | ..................... | 709/224 |
| 7,222,162 B2 * | 5/2007 | Lee et al. | ..................... | 709/217 |
| 7,630,944 B2 | 12/2009 | Rupp et al. | | |
| 7,631,098 B2 | 12/2009 | Boutboul et al. | | |
| 7,644,150 B1 | 1/2010 | Nucci et al. | | |
| 2003/0041138 A1 * | 2/2003 | Kampe et al. | ................. | 709/223 |
| 2009/0055382 A1 * | 2/2009 | Kerschbaum | ..................... | 707/5 |
| 2009/0222583 A1 * | 9/2009 | Josefsberg et al. | ........... | 709/245 |
| 2010/0268764 A1 * | 10/2010 | Wee et al. | ..................... | 709/203 |
| 2010/0333104 A1 * | 12/2010 | Unnikrishnan et al. | ...... | 718/105 |

* cited by examiner

*Primary Examiner* — Oanh Duong
(74) *Attorney, Agent, or Firm* — Marsh Fischmann & Breyfogle, LLP; Jon P. Deppe; Kent A. Lembke

(57) ABSTRACT

Systems and methods for dynamic intelligent mirror selection are presented. Dynamic intelligent mirror selection may include evaluating available mirrors at a client to determine an optimum mirror from which to download a portion of data. For each portion of data downloaded, reevaluation of the available mirrors may be provided such that dynamic selection of the mirrors may reflect changes in network conditions. The mirror selection may be based at least partially on observed characteristics of mirrors observed while downloading from a mirror, such that no synthetic work load is needed to benchmark mirror performance. The observed characteristics may include transfer speed, error counts, latency, and mirror load. Furthermore, a random bonus and usage bonus may be provided to help in facilitating the evaluation of available mirrors.

15 Claims, 4 Drawing Sheets

DYNAMIC INTELLIGENT MIRROR HOST SELECTION

FIELD OF THE INVENTION

The present invention generally relates to dynamic intelligent selection of a host for data downloading. Specifically, the present invention relates to dynamic intelligent mirror selection based on observed characteristics of a plurality of mirrors that are in turn used to select a mirror from which to download a portion of data.

BACKGROUND OF THE INVENTION

It has become increasingly common to download data from a network. For instance, updates to software or even complete applications, operating systems, or other software may be available for download from a network. Therefore, large amounts of data may be downloaded from hosts (e.g., servers or the like). As such, it may be advantageous to provide a high-quality connection between a client and a host (e.g., a connection with high transfer speed, low latency, and few errors) to facilitate efficient downloading of a large quantity of data.

In an effort by network administrators to provide such reliable, high-speed network connections, data may be made available on a plurality of hosts. For instance, these hosts may have substantially identical data sets available for download, thus providing for redundant data availability. Hosts having substantially identical data available for download are commonly referred to as mirrors. In this regard, in the event one mirror is unavailable, the data may still be downloaded from an alternate mirror on the network.

Because the mirrors may be at different geographic locations and different locations in the network, network topology and network conditions associated with each of the mirrors may be different. Furthermore, these conditions may be different for each particular client attempting to download data from the mirrors. Accordingly, different clients in the network may experience different connection conditions with respect to the same mirror because of network topology or network conditions between the client and mirror. In turn, the selection of the mirrors from which data is downloaded may have an effect on the quality of the download.

However, when selecting a mirror from which to download data, previous systems have failed to provide a way of dynamic intelligent selection of mirrors. For instance, in some prior systems a user may be presented with a list of each available mirror and the user may be required to select a mirror the user would like to use for downloading data. In such instances, the user may not be provided with any additional information on which to base a selection other than a listing of the available mirrors. Many users lack the knowledge required for determining which mirror represents an optimal mirror from which data can be downloaded. Thus, the result may be naive decisions regarding selection of a mirror. That is, the mirror selection may be random or fail to take into account current network conditions or network topology. This problem is exacerbated considering the determination of an optimal mirror often involves knowledge of the location of the client in the network relative to the available mirrors. Furthermore, network conditions may be variable such that a selection of an optimal mirror at a first instance may not be the same at a second instance.

Furthermore, even if a user does have the required knowledge to determine which mirror is an optimal mirror from which to download data, previous systems often require the selection of a mirror to be permanently set (or set until the client is reset). As such, these systems may not take into account changes in the performance or topology of the network. Furthermore, if the client changes location in the network, previous systems may not allow for a change in mirror selection. In this regard, a static mirror selection may provide a suboptimal connection at the new location in the network. The mirror originally selected may continue to be used for downloads despite changes in the network that may result in a different mirror being the optimal mirror from which to download data.

Another approach used by prior systems includes benchmarking known mirrors using a synthetic workload. In this regard, these systems may download an otherwise useless portion of data simply to benchmark the speeds at which the useless portion of data was downloaded from the available mirrors. These prior systems may be operative to set the mirror from which the otherwise useless portion of data was downloaded as the selected mirror. However, these prior systems may include that the mirror selection is static for at least the duration of the transaction. In this regard, fluctuations in network performance and errors from the mirrors are not taken into account. If the performance of the chosen mirror degrades after selection of the mirror or other network conditions change after the mirror is selected, the user may be stuck with the selection despite the changes in the network.

Additionally, a system employing synthetic workloads is suboptimal because it requires the client to perform superfluous downloads of data that are in turn used only to benchmark the speed of the available mirrors. That is, the superfluous downloads have no other purpose aside from benchmarking the speeds of the mirrors. Thus, the workload of the client is increased while the optimal mirrors may not have been selected in light of fluctuations in network performance.

SUMMARY OF THE INVENTION

The present invention addresses the above problems by facilitating dynamic intelligent mirror selection. Accordingly, systems and methods are presented wherein available mirrors are dynamically evaluated based on observed characteristics of the mirrors to determine an optimum mirror from which to download a portion of data. The evaluation of mirrors may include assigning each mirror a quality value and comparing the quality values of mirrors. The selection of a mirror may be dynamic such that the available mirrors are repetitively evaluated after downloading portions of data. As evaluation occurs based on downloads of useful data, no superfluous data is downloaded for benchmarking the available mirrors. Furthermore, as the present invention facilitates dynamic selection of mirrors, the disadvantages of static mirror selection may be overcome.

Accordingly, a first aspect of the present invention includes a method for downloading data to a client using dynamic intelligent mirror selection from a plurality of mirrors in a network. The method involves assigning, using a microprocessor at the client, a first quality value to each of the plurality of mirrors based on one or more characteristics regarding the plurality of mirrors. The mirrors may include substantially identical data for downloading. Generally, when assigning a quality value to mirrors, desirable characteristics demonstrated by the mirror may tend to increase the quality value while undesirable characteristics may tend to decrease the quality value. The characteristics of mirrors may be compared to other gathered characteristics when determining quality values (e.g., the mirror with the highest transfer speed may receive a certain quality value, etc.), or may be compared against an absolute scale for each characteristic (e.g., transfer speeds of a mirror falling within certain ranges may receive a quality value according to the range into which a mirror belongs, etc.).

The method also involves selecting a first mirror from the plurality of mirrors based on the first quality value of the first mirror and first downloading a first portion of the data from the first mirror. For instance, the selecting of a mirror may include comparing the quality values of all available mirrors and selecting the mirror having the highest quality value.

The method of the first aspect further involves assigning, using a microprocessor at the client, a second quality value to each of the plurality of mirrors based on one or more characteristics regarding the plurality of mirrors including one or more characteristics of the first mirror observed during the first downloading. The method also includes selecting at the client a second mirror from the plurality of mirrors based on the second quality value of the second mirror and second downloading a second portion of the data from the second mirror.

Various features and refinements of the above noted method may also be provided. For example, in one embodiment, the one or more characteristics regarding the plurality of mirrors may include characteristics of the plurality of mirrors that have been observed during previous downloads of data from the plurality of mirrors. Thus, stored characteristics of mirrors observed from previous downloads may be used to assign quality values. In this regard, each time data is downloaded from a mirror, data regarding that mirror may be collected for future use in evaluating mirrors.

In one embodiment, the quality values comprise integers used for quantifying the characteristics of mirrors. In this respect, desirable characteristics (e.g., high transfer speed, low latency, few errors, etc.) may result in an increased quality value. Contrarily, undesirable characteristics (e.g., low transfer speed, high latency, many errors, etc.) may result in a decreased quality value.

In another embodiment, the assigning may further comprise allotting a usage bonus based on a number of times a mirror has been used to download data to the client. A mirror that has been used a fewer number of times may receive a larger usage bonus than a mirror that has been used a greater number of times. Furthermore, once a mirror has been used a predetermined number of times, the usage bonus may go to zero. In this regard, a mirror that has never or rarely been used may be given a relative advantage versus a mirror that is frequently used. This may promote the client attempting to download from other mirrors to ensure all mirrors are sampled. However, once a mirror has been used a number of times, observed characteristics may substantially affect selection of the mirror, rather than the number of times the mirror has been used.

In another embodiment, the assigning may further include allotting each mirror of the plurality of mirrors a random bonus value. The random bonus value may provide disparity in quality values between similarly situated mirrors. As such, similarly situated mirrors may be somewhat randomized such that no one mirror dominates or monopolizes data downloads by virtue of a marginally higher quality value than other mirrors. By marginally higher, it is meant that one mirror may have a higher quality value, yet may not demonstrate a substantial increase in performance over mirrors with similar quality values. Thus, there may be mirrors that demonstrate similar performance, yet one mirror may have a slightly higher quality value. In this instance, it may be desirable to continue to download from similarly performing mirrors to ensure that a change in performance (e.g., for better or worse) may be evaluated in the mirrors.

In yet another embodiment, the one or more characteristics may comprise an error count. An error count may be a running total of the number of errors a client experiences when downloading from a mirror. A mirror may be penalized for each error in the error count. Additionally, data errors (e.g., checksum errors) may be penalized more than transient network errors (e.g., failure to connect, timing out of the mirror, internal mirror errors, etc.).

Furthermore, the one or more characteristics may include a mirror load value. A mirror load value may be representative of the number of clients or sessions open for each mirror. As such, the method may include randomly penalizing a mirror once a threshold mirror load value is observed. A threshold mirror load value may be based upon a load value for which the mirror begins to experience over-commitment of resources resulting in a decrease in mirror performance. Further still, in one embodiment, the one or more characteristics may include a transfer speed between a mirror and the client. The transfer speed may include normalizing the speed of connection of a mirror with respect to a transfer speed of an origin.

In another embodiment, a decay value may be applied to the one or more characteristics based upon an amount of time that has passed since the one or more characteristics were observed. In this regard, the decay value may be greatest for the oldest observed characteristics. In this regard, newer data (i.e., data from downloads that occurred more recently) may be more representative of current network conditions and may be given more weight in the assigning than older characteristic data.

In another embodiment, the first mirror and the second mirror may be different. Additionally, the method may be repeated until all of the data is downloaded.

A second aspect includes a computer-based system for downloading a data set using dynamic intelligent mirror selection from a plurality of mirrors in a network. The computer-based system includes an interface module operative to communicate with the plurality of mirrors. Additionally, the computer-based system includes a mirror characteristic storage module in operative communication with the interface module that is operative to store, in a storage device, one or more characteristics of each of the plurality of mirrors based on observation of communication between the mirrors and the interface module. In addition, the computer-based system may include a mirror quality calculation module that includes a microprocessor. The mirror quality calculation module is in operative communication with the mirror characteristic storage module and is operative to calculate a quality value for each of the plurality of mirrors based on the one or more characteristics of the plurality of mirrors. The computer-based system may also include a mirror comparison module in operative communication with the mirror quality calculation module to receive the quality values for each of the plurality of mirrors. The mirror comparison module is further operative to designate to the interface module a mirror selection of one of the plurality of mirrors based on the quality values of the plurality of mirrors from which the interface module is to download data. The computer-based system operates to dynamically update the mirror selection based on transient network conditions after downloading a portion of the data set.

Various features and refinements of the above noted computer-based system may also be provided. For example, in one embodiment, the mirror characteristic storage module may be operative to store characteristics for the plurality of mirrors observed at a plurality of instances. Thus, characteristic data observed during downloading of data from mirrors may be stored such that the characteristic data may be used in evaluation of the available mirrors.

In yet another embodiment, the computer-based system may be operative to download a plurality of data portions from a plurality of mirrors, and the mirror comparison module may be operative to designate to the interface module a mirror selection after the download of each of the plurality of data portions. In this regard, the selection of mirrors is not static, but rather may be dynamically updated during the downloading of the data set. For instance, between downloading portions of the data set the mirrors may be reevaluated and the mirror selection may be updated.

Still further, a third aspect of the present invention includes a method for dynamically choosing a mirror at a client from a plurality of mirrors on a network. The method involves observing, at said client linked to the network, one or more characteristics of each of the plurality of mirrors in the network when downloading data from the plurality of mirrors over the network to the client, evaluating the one or more characteristics at the client to generate a quality value for each of the plurality of mirrors, and dynamically choosing, using a microprocessor at the client, a mirror from which to download an additional portion of data over the network based on the evaluating.

Various features and refinements of the above noted method may also be provided. For example, in one embodiment the method is repeated a plurality of times until a data set including a plurality of data portions is fully downloaded. In another embodiment, the dynamically choosing includes allotting a usage bonus to the plurality of mirrors. In still another embodiment, the dynamically choosing includes allotting a random bonus to the plurality of mirrors.

Any of the embodiments, arrangements, or the like discussed herein may be used (either alone or in combination with other embodiments, arrangements, or the like) with any of the disclosed aspects. Additionally, a reference of a feature in conjunction with the phrase "in one embodiment" does not limit the use of the feature to a single embodiment. In addition to the exemplary aspects and embodiments described above, further aspects and embodiments will become apparent by reference to the drawings and by study of the following descriptions.

DETAILED DESCRIPTION

Figure 1:
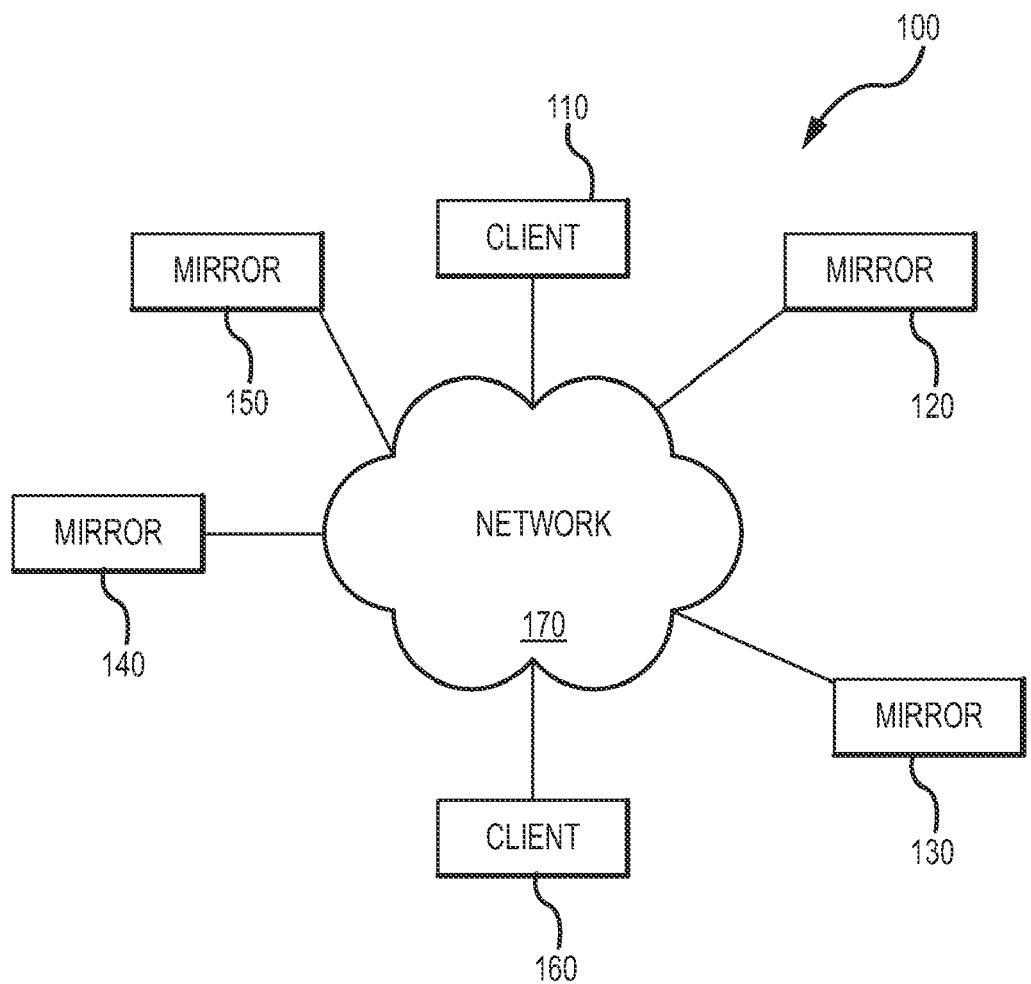
FIG. 1 is a schematic drawing of a system in which dynamic intelligent mirror selection may be employed.

FIG. 1 depicts a system 100 in which a client (e.g., client 110 or client 160) may be able to connect to a plurality of mirrors (e.g., 120, 130, 140, or 150) by way of a network 170. The network 170 may be any known type of network such as a wide-area network (e.g. the Internet), an Ethernet, a wireless network, a local area network or any type of network known the art through which a client may be able to connect to a plurality of mirrors to download data from a mirror. The clients 110 and 160 may comprise nodes in the network 170.

For example, client 110 and 160 may be workstations, terminals or other types of access points that are able to access a network to connect to mirrors. In this regard, the clients 110 and 160 may be personal computers, workstations, terminals or other appropriate devices or systems operative to connect to the network 170. The clients 110 and 160 may include processors, memories, user interfaces, and communications devices such as modems, network access cards, Ethernet connections, wireless devices, or other appropriate devices for connecting to and communicating with other devices in the network 170.

The clients 110 and 160 may each be operable to connect to any of a plurality of hosts available on the network 170. The hosts may be servers or other appropriate computer appliances or hardware connected to the network 170. The hosts may be accessible by clients (e.g., client 110 or client 160) such that clients may download data from any of the hosts. In one embodiment, the hosts may comprise mirrors 120-150. As such, substantially identical data may be provided by each mirror 120-150. In this regard, client 110 or client 160 may download a data set or any portion of a data set from any of the mirrors 120-150 available in the network 170.

In turn, as each mirror 120-150 may provide substantially identical data for downloading, each client 110 and 160 may be presented with a selection of mirrors from which the client may download data. The clients 110 and 160 may be operative to make dynamic intelligent selections regarding the mirror from which the client downloads data. This dynamic intelligent mirror selection may be at least partially based on characteristics of the mirrors from the perspective of each client to determine which mirror of the multiple available mirrors offers the optimal connection to the client. The characteristics of each mirror may be observed and recorded each time data is downloaded from one of the mirrors. For instance, characteristic data may be stored in a storage device. In this regard, a dynamic selection of mirrors may be facilitated wherein network topology between mirrors and the client, mirror characteristics, and connection characteristics may be taken into consideration when selecting a mirror from which to download a data portion. Mirror characteristics or connection characteristics for a plurality of instances may be stored at the client for a plurality of mirrors. This stored characteristic data may in turn be used to evaluate the relative performance of mirrors to select the mirror having the optimal performance from among the available mirrors.

For example, the client 110 may be at a first location within the network 170. One of the mirrors 120-150 may represent an optimal mirror from which the client 110 may download data based on the location of the client 110 in the network, the topology of the network 170 between the client 110 and mirrors 120-150, and the connection characteristics between the client 110 and mirrors 120-150. That is, one of the mirrors may provide a connection to the client that provides optimum mirror characteristics for downloading data based on the connection between that mirror and the client. The characteristics of the connection between the client and mirror may be affected by network topology, among other factors.

Additionally, in the system 100 there may be a second client 160 at a different network location than the client 110. The client 160 may also be operative to communicate with any of the mirrors 120-150 that contain substantially identical data for download. Client 160 may have similar features and characteristics of client 110 with the exception of the location of client 160 in the network, which may be different than the location of client 110 in the network. In this regard, client 160 may be subject to different network topology with respect to mirrors 120-150, such that the optimal mirror for client 160 may be different than the optimal mirror for client 110. Additionally, client 110 or client 160 may move to any number of locations in the network. As such, for each different location in the network 170, the optimal mirror may be different. Thus, if the optimal mirror selection is set by a client and remains static, changes in the network 170 or movement of a client in the network 170 may not be reflected and the mirror used for downloading may not be optimal. Thus, continued usage of a static mirror selection may provide suboptimal performance.

In this regard, dynamic intelligent mirror selection may be employed in the system 100 to alleviate the problems associated with a static mirror selection. For instance, in one example a client may be a portable computing device connected to the network 170. Client 110 may be representative of the portable computing device when the portable computing device is connected to the network 170 in a New York office. In this instance, client 110 may be operative to select one of the mirrors 120-150 using a dynamic intelligent mirror selection process to provide an optimal connection from which to download data when the portable computing device is connected as client 110.

However, at a second instance the same portable computing device may connect to the network 170 from a Hong Kong office represented as client 160. In this regard, the change of position of the portable computing device in the network 170 may result in the originally selected optimal mirror being a suboptimal selection based on the change of position of the portable computing device in the network 170. As such, a different mirror may be dynamically intelligently selected for downloads when the portable computing device is connected as client 160. In this regard, dynamic intelligent mirror selection may be a client specific evaluation of mirrors such that the evaluation differs from one client to another or from one location in the network to another location in the network. Moreover, the intelligent mirror selection process may be dynamic in that the process may be continually or repetitively used to update optimal mirror selection.

Also, while the process of dynamic intelligent mirror selection is described with reference to changing positions in the network 170, it will be further understood by one of ordinary skill in the art that without changing positions in the network 170, a client may advantageously be able to dynamically intelligently select a mirror from which to download data rather than employing a static mirror selection method. That is, network conditions, network components, or other factors may change such that the connection properties between a client and a selected mirror may also change from time to time. In this regard, a mirror selected at first instance by a client may not be an optimal mirror at a second instance for the same client in the same network location because of changed network conditions. Accordingly, a client may be operative to continually or periodically evaluate the available mirrors to facilitate dynamic selection of the optimal mirror available from which to download data.

The dynamic evaluation of mirrors to determine an optimal mirror may be repeated at different intervals to continually monitor network conditions to determine the optimal mirror. For instance, when downloading a data set from one of the mirrors, the data set may be segmented into a plurality of data portions. In this regard, upon the completion of the downloading of a data portion, a client may be operative to reevaluate the mirrors to determine from which mirror the next portion of data should be downloaded, such that the next portion of data is downloaded from the optimal mirror available to the client.

A data set may comprise a number of files such that the data portions correspond to one of the files that comprise the data set. Furthermore, each data portion may comprise less than a full data file such that the data set is segmented into portions smaller than individual files. In this regard, portions of a single file may be downloaded from a plurality of mirrors. Each data portion may alternatively comprise more than one data file. In any regard, upon completion of the download of a portion of the data file, the mirrors may be reevaluated by the client to determine which mirror represents the optimal mirror from which to download the next data portion.

Additionally, the frequency at which the dynamic intelligent mirror selection takes place may also vary (e.g., selection may occur after every data portion downloaded, after every 5 data portions downloaded, after ever 10 data portions downloaded, after every 100 data portions downloaded, etc.). The frequency at which mirror selection occurs may depend on the number of times each available mirror has been used. For instance, when the available mirrors have each been used for downloading less than 10 times, the selection process may occur after every data portion downloaded. Further, in this example, if all available mirrors have each been used more than 10 times and less than 100 times, the selection process may occur after every 10 data portions downloaded. Continuing the example, if all the available mirrors have each been used 100 times or more, the selection process may occur after every 100 data portions downloaded. This example is provided for exemplary purposes only. Accordingly, the number of times each available mirror has been used and the number of data portions between downloads may be any reasonable value.

When performing dynamic intelligent mirror selection, several parameters may be measured and compared to determine the relative quality of mirrors available to a client. In this regard, analysis may be undertaken to determine which of the available mirrors represents an optimal mirror from which data may be downloaded to a client. The analysis of mirrors may empirically measure network conditions as reflected by connection properties between the client and each mirror.

For instance, the transfer speed between a client and a mirror, the return of errors by the mirror, the latency between a client and a mirror, and a load of the mirror may be evaluated to determine which of the mirrors provides the optimal connection from which to download data to the client. This is not intended to be an exhaustive list such that other desirable aspects of a mirror or undesirable aspects of a mirror tending to increase or decrease quality of a mirror may be measured or evaluated in the dynamic intelligent mirror selection process. Such parameters or characteristics may be measured for each mirror by the client when the client is connected to the mirror and downloading a portion of data from the mirror. Thus, as the client downloads data from different mirrors, the characteristics demonstrated by each mirror during the download may be stored by the client to be used in evaluation of the mirrors.

A client may assign integer values to mirrors that quantify qualities of the mirrors to effectively determine which mirror is optimal. This quantification of the quality of the client/mirror connection may be represented as a quality value (e.g., an integer value). Thus, desirable characteristics may result in an increase in the quality value, whereas undesirable characteristics may result in a penalization of a mirror's quality value.

As such, the transfer speed between a client and a mirror may affect the quality value assigned to a mirror, wherein a high connection speed (e.g. as measured as throughput in bytes per second) may result in a higher quality value being assigned to that particular mirror. Accordingly, a slower connection speed may result in a mirror being assigned a lower quality value.

Also, a mirror may have an origin from which the data provided by the mirror originates. In this regard, data is originally provided on an origin and thereafter, a mirror may obtain the data, replicate the data, and provide a substantially identical copy of the data. In one embodiment, when assigning quality values based on the transfer speed between a client and a mirror, the speed of the mirror may be normalized against the speed of the origin.

Furthermore, a mirror that experiences errors is less desirable than a mirror that is error free. Accordingly, upon the occurrence of a mirror error, the mirror from which the error was received may be penalized based on the error. An error count may be maintained for each available mirror, such that with each error, a corresponding penalization is given to the mirror.

Additionally, the severity of a mirror error may also be taken into account. As an example, a checksum may be downloaded prior to downloading data from a mirror. Upon completion of the download of the data, the downloaded data may be compared to the checksum to determine if any data errors are present in the received data. If such an error is detected, the mirror from which the corrupt data was received may be penalized relatively heavily. Contrarily, other types of errors may be less severely penalized such as, for instance transient network errors such as a failure to connect, a mirror timeout, or the like.

Also, an optimal mirror would provide for low latency between the client and mirror. Latency is the amount of time it takes for a message sent from one node on a network to reach another. This is essentially the amount of time it takes for the electrons or photons to move from one place to another. Latency generally increases as the data has farther to travel. As an example, when performing an HTTP request of a file from a mirror in New York from a computer in Los Angles, it will take some amount of time for the request to reach the computer in Los Angles. Additionally, it will take some amount of time for the return from Los Angeles to reach New York. This delay can generally be referred to as latency.

In one embodiment, latency is approximated by measuring the time required to establish a connection to a mirror. Thus, a short latency may mean that a short time may be required to establish a connection and a high latency may mean that a long time may be required to establish a connection. The amount time required for a client to connect to a mirror may be measured and evaluated. A high latency value for a mirror may result in the mirror being penalized more heavily than a mirror having a low latency value. Alternatively, a bonus may be added to a quality value based on a low latency. Further still, a threshold latency may be established such that lower latencies than the threshold result in a bonus to the quality value, while higher latencies may result in a penalization of the quality value. In any regard, a low latency will be favored over high latency. Other measures approximating or evaluating latency may also be used. In this regard, it will be appreciated that mirrors with lower latency or lower approximated latency may be favored versus a mirror with higher latency.

In the discussion presented above, the characteristics used for determining the quality value for a mirror have been directed to characteristics that are observed during the connection and downloading of data from a mirror. That is, the characteristics related to speed of connection, mirror errors, and latency may be determined when a mirror is used for downloading data. In this regard, upon initiation of a dynamic intelligent mirror selection process the client may have an insufficient amount of data regarding the characteristics of the mirrors to make a selection. This may correspond to the initialization of a system, wherein no downloads have taken place, such that the client is unaware of any mirror characteristics. Accordingly, an infrequently used mirror may receive a usage bonus such that the mirror may be selected by the client despite a lack of characteristic information obtained by observing downloads from that mirror.

This lack of usage bonus may be decreased with the increase in the number of times a mirror is used, such that characteristics observed during the downloading of data from the mirror will eventually be used to assign the quality value of a mirror, as opposed to the number of times a mirror has been used for downloading. In this regard, the usage bonus may ensure the client initiates data downloads with new or seldom used mirrors. That is, the usage bonus may ensure the mirror continues to sample new mirrors despite a lack of characteristic data being available for a new mirror. However, at some threshold value, the usage bonus may completely be phased out such that the quality of the mirror may be solely determined by the data gathered during downloads from that mirror.

Additionally, there may be situations where all mirrors have an identical quality value (e.g., as in the case where no mirror has been used for any data download) or very similar quality values such that closely matched mirrors may not be used for download due to a slight advantage in a quality value of another mirror. Thus, the parity of the quality values of the mirrors may prevent mirrors from being used and evaluated. In turn, changes in network conditions may not be accounted for if only a small subset of the available mirrors is predominately used. In this regard, a random bonus may be assigned to each of the mirrors. In the situation where no mirror has been used (i.e., no mirror has any observed characteristics based on previous downloads), the random bonus may provide a means for randomly selecting a mirror from which to download data in order to begin gathering data from various mirrors. Alternatively, in a situation where data has been gathered from a plurality of mirrors and two or more mirrors are closely matched such that there is very little disparity between the mirrors quality values, the random bonus may be employed in order to ensure that multiple mirrors are used for downloading so that a single mirror does not monopolize downloads over similarly situated mirrors. In this regard, the client may continually sample similarly situated mirrors, such that if the quality of one mirror degrades or the quality of another mirror improves, the mirror may be operative to recognize the change when downloading from the mirrors.

Furthermore, a mirror characteristic used in the dynamic intelligent mirror selection may be a mirror load. A mirror may advertise a description that may correspond to the mirror load. For instance, in one embodiment, a mirror may advertise the number of users connected to the mirror. Alternatively, one user may comprise several authenticated clients connected to the mirror. As such, the number of sessions of a mirror may be advertised. Further still, mirror load may be described generically as a real or synthetic number representing some characteristic about how much work the mirror is currently processing. A high mirror load may be indicative of a high quality mirror. However, as mirror load increases, the load may eventually reach a region where resources of the mirror are overcommitted such that a decline in performance is experienced by the mirror.

This decline in mirror performance may be a result of overtaxing mirror resources, such that if the number of users connected to the mirror declines, the quality of the mirror may be maintained. In this regard, if a mirror load is used in determining quality, and the mirror load exceeds a predetermined threshold, the quality of the mirror may be penalized such that clients are diverted to another mirror. Thus, the load of the mirror may decline such that the advertised mirror load also declines and the mirror's quality number increases. Thus, clients may promote the mirror once lower mirror loads are advertised. In turn, the mirror may again become overcommitted such that the quality again goes down. Thus, the mirror may experience a cyclical loading effect as clients divert from an overcommitted mirror and divert back to the mirror once the load falls below a threshold level.

Furthermore, if a number of clients divert away from an overcommitted mirror, the diversion of clients may result in the mirror being underutilized. Additionally, if many or all of the clients that divert from the overcommitted mirror connect to one or a few other mirrors, those other mirrors may also experience over-commitment of resources such that clients begin to divert from one mirror to another, over-committing each mirror to which the clients divert (e.g., diverting clients may cause a cascade failure of other mirrors).

Thus, once a threshold mirror load value has been exceeded, the client may be operative to assign to the overcommitted mirror a random penalization. Thus, some clients may penalize the overcommitted mirror more heavily than others. In turn, a portion of the clients using the overcommitted mirror may divert to another mirror. As not all clients may divert, the problems set forth above may be avoided. Thus, the random provision of penalties by a client when a mirror over-commits may allow for the mirror to return to mirror load values below a threshold value while preventing a large portion of the clients from diverting to a mirror resulting in over-commitment of the diverted-to mirror. Also, the mirror may not fall drastically below the threshold value as only the clients with relatively large random load penalties are diverted.

Figure 2:
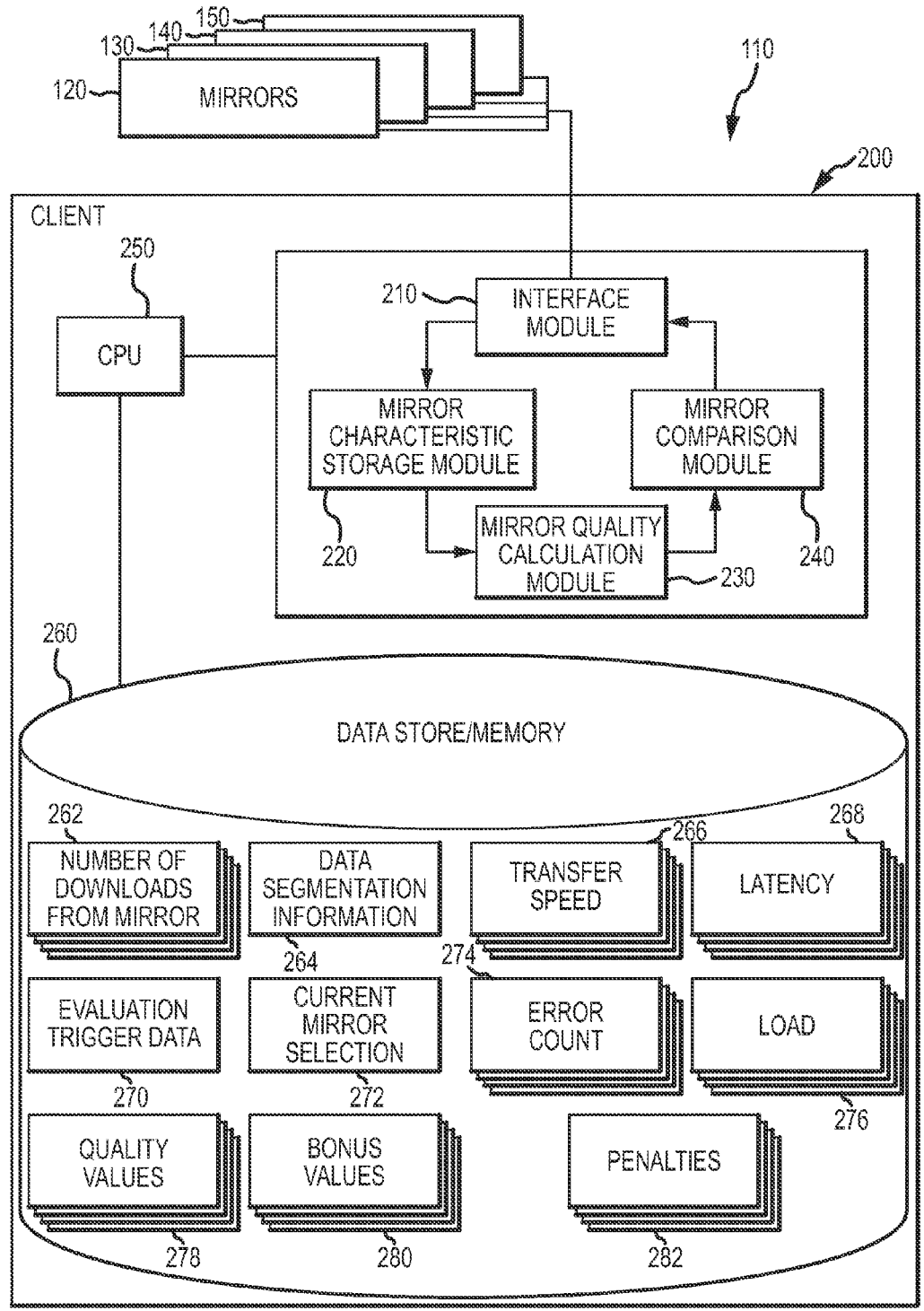
FIG. 2 is a schematic drawing of a client operative to employ dynamic intelligent mirror selection.

FIG. 2 depicts further detail of a client 110 that is operative to perform dynamic intelligent selection of a mirror from plurality of mirrors such that an optimal mirror is selected for downloading data. The client 110 may be operative to communicate with mirrors 120-150. Furthermore, the client 110 may include a central processing unit (CPU) 250. The CPU 250 may be operative to coordinate processes and other functions of the client 110. The CPU 250 may be in communication with a dynamic intelligent mirror selection module 200. The dynamic intelligent mirror selection module 200 will be described in more detail below.

The client 110 may further include a storage device 260. The storage device 260 may be operative to store data used in the dynamic intelligent mirror selection process. The storage device 260 may be accessed by the CPU 250 or may be accessed directly by one or more of the modules of the dynamic intelligent mirror selection module 200.

The storage device 260 may include data related to the number of times each available mirror has been used in downloading 262. Furthermore, the storage device 260 may include data segmentation information 264 that may be used in determining how the data to be downloaded has been segmented as described above. The storage device 260 may also contain transfer speed data 266 for each available mirror. The storage device 260 may also contain latency data 268 for each available mirror. The storage device 260 may also contain evaluation trigger data 270 that may be used to determine when to initiate or undertake reevaluation of the available mirrors. The storage device 260 may also contain data regarding the current mirror selection 272. The storage device 260 may additionally contain error count data 284 for each available host. The storage device 260 may also contain mirror load data 276 for each available mirror. Also, the storage device 260 may contain quality values 278 for each available mirror. The storage device 260 may contain bonus values 280 for each available host. Additionally, the storage device 260 may be operative to store penalty data 282 for each available mirror. While various data has been described, it will be understood by one of ordinary skill in the art that the storage device 260 may further be operative to store other useful information used in a dynamic intelligent mirror selection process.

As stated above, the client 110 may include a dynamic intelligent mirror selection module 200. The dynamic intelligent mirror selection module 200 may include a number of sub modules. It will be understood that these modules may include software, hardware, firmware, or a combination thereof. In this regard, the modules may operate on a computer-based system such that the modules may include processors, memories, and other computer hardware. Also, one of ordinary skill in the art will recognize that the modules are described below for clarity and modules may be combined such that fewer modules than those described below may be provided or additional modules may be provided than those described below.

The client 110 may include an interface module 210 that is operative to communicate with a plurality of mirrors 120-150. The interface module 210 may be operative to communicate with mirrors 120-150 such that the interface module 210 may request and in turn download data from any of the mirrors 120-150.

The interface module 210 may be in further communication with a mirror characteristic storage module 220. The mirror characteristic storage module 220 may be able to observe a plurality of characteristics (e.g., the characteristics described above including but not limited to transfer speed, error count, mirror latency, and mirror load) of each of mirrors 120-150. The characteristics of each of the mirrors 120-150 may be stored in the storage device 260 as described above. The mirror characteristic storage module 220 may be operative to store these values for each mirror 120-150 for a plurality of instances such that characteristics of the mirrors may be stored in the storage device 260.

In this regard, it will be understood that with changing network conditions, data collected more recently may be of higher value than older data. Because older data represents network conditions as they existed at the time the data was collected, newer data may be more representative of current network conditions. Accordingly, a decay value may be applied to older data such that the older data may have less effect on a quality value than more recently gathered data. Thus a decay value may allow for older data to be discounted such that newer data more heavily influences the determination of the quality values of mirrors. A threshold value may be provided such that characteristic data collected that is older than the threshold value is no longer used in assigning quality values. In this regard, a timestamp may be stored along with the characteristic data stored by the mirror characteristic storage module.

A mirror quality calculation module 230 may be in operative communication with the mirror characteristic storage module 220 or the storage device 260. The mirror quality calculation module 230 may be able to access the characteristics stored by the mirror characteristic storage module 220 in order to assign a quality value to each of the mirrors. As described above, the quality value is generally affected by the characteristics such that desirable characteristics of a mirror increase the quality value, while undesirable characteristics of a mirror decrease the quality value. The mirror quality calculation module 230 may further be operative to store the quality values 278 in the storage module 260.

The mirror quality calculation module 230 may be further operative to employ a usage bonus as described above. Further still, the mirror quality calculation module 230 may be operative to apply a random bonus in a manner as described above. In this regard, the mirror quality calculation module 230 may be operative to generate and assign a quality value 278 for each of the mirrors 120-150.

A mirror comparison module 240 may be able to compare the quality values and choose the mirror having the largest quality value that represents the optimal mirror from which to download data. As such, the mirror comparison module 240 may in turn be in operative communication with interface module 210 such that the mirror comparison module 240 directs the interface module 210 to select a mirror from which to download data. Also, the mirror comparison module 240 may be operative to store a current mirror selection 272 in the storage module 260.

In one example of the operation of the client 110, the interface module 210 may have been operative to have downloaded data portions from each of the mirrors 120, 130, 140, and 150. Accordingly, characteristic data (e.g., transfer speed data 266, latency data 268, mirror load data 276, error count data 284, etc.) may have been collected for each of the mirrors 120-150 that are in turn stored in the storage module 260. The mirror quality calculation module 230 may access the mirror characteristic storage module 220 or the storage device 260 and use the characteristic data stored therein to assign quality values to the mirrors as follows: mirror 120-4, mirror 130-6, mirror 140-8, and mirror 150-5. Thus, mirror comparison module 240 may direct the interface module 210 to download the next data portion from mirror 140 as it has the highest quality value of the available mirrors.

However, prior to the downloading of the next data portion from mirror 140, network conditions may have changed (e.g., mirror 140 may experience an error, the client 110 may have moved in the network, a link in the network between the client 110 and mirror 140 may have changed, etc.). Thus, based on the downloading of the data portion from mirror 140 after the change in network conditions, the characteristics of mirror 140 observed during the downloading may result in the performance of mirror 140 degrading. As such, the quality values after this download may be assigned by the mirror quality calculation module 230 as follows: mirror 120-4, mirror 130-6, mirror 140-4, mirror 150-5. In this regard, the mirror comparison module 118 may be operative to direct the interface module 210 to download the next portion of data to be downloaded from mirror 130. This process may be repeated for each portion of data to be downloaded.

Figure 3:
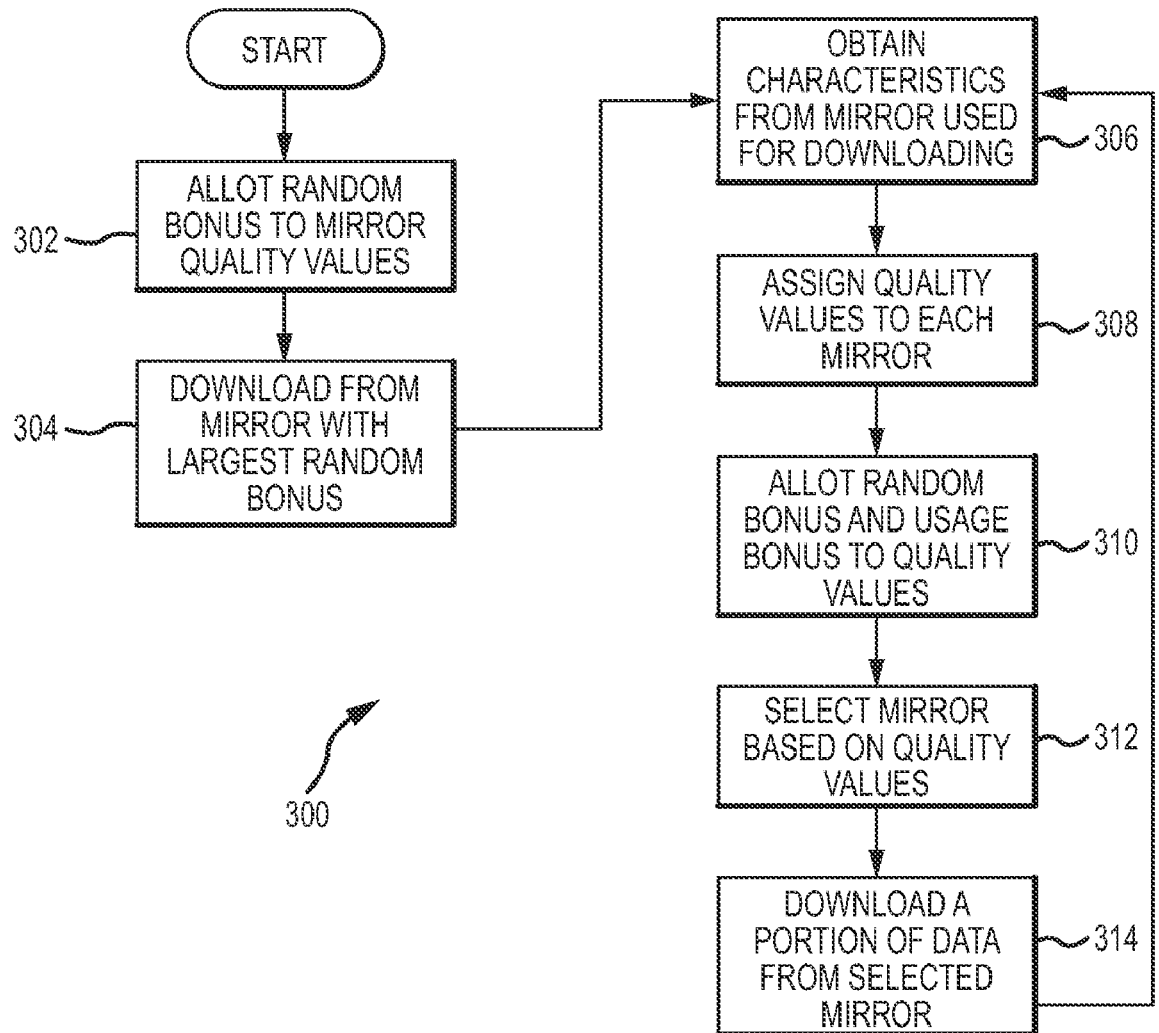
FIG. 3 is a flowchart that depicts a protocol useful for dynamic intelligent mirror selection.

A protocol 300 for dynamic intelligent mirror selection is depicted with reference to FIG. 3. The protocol 300 may begin at start-up of the dynamic intelligent mirror selection when no mirror characteristic data has been collected because no downloads have been performed by the client. Accordingly, evaluation of mirrors based on data obtained during downloading (e.g., transfer speed, error counts, latency, etc.) may not be possible as no downloads may have taken place.

In this regard, when assigning quality values to mirrors prior to the client undertaking any downloads, quality values for each mirror may be the same (e.g., zero as no data is available for any of the mirrors). Thus, there is no data to create disparity between mirrors. Accordingly, the initialization protocol 300 depicted in FIG. 3 may include allotting 302 a random bonus to all mirrors from which data may be downloaded. Accordingly, the otherwise equal quality values may be differentiated by the allotting 302 of random bonus values.

Based on the random values assigned 302, data may be downloaded 304 from the mirror with the largest random bonus assigned 302.

In this regard, data downloaded 304 from the mirror with the largest random bonus may result in data being obtained 306 during the downloading 304 of a first portion of data from that mirror. Thus, this may result in a situation where, during the assignment 308 of quality values to the mirrors, the first mirror used for the downloading 304 may have a larger quality value than any other mirror by virtue of the fact that data is available from which to calculate a quality value for the first mirror. Accordingly, the first mirror may monopolize the download of data because mirror characteristics are available for the first mirror.

As a result, the protocol 300 may further include allotting 310 both a random bonus and a usage bonus to each of the available mirrors. Accordingly, the random bonus values may help to ensure that each available mirror is sampled to determine the characteristics of the mirrors. Furthermore, the allotment 310 of a usage bonus allows for mirrors from which data has not been downloaded to gain a relative advantage over mirrors that have been used such that those mirrors are likely to be chosen for data download in order to compile data regarding the less frequently used mirrors. As discussed above, as the number of times a mirror is used for download increases, the smaller the usage value allotted to that mirror becomes, such that the characteristics of the mirror eventually determine the quality value of the mirror without using a usage bonus.

The protocol 300 may further include selecting 312 a mirror based on the quality values assigned 308 and the allotment 310 of the bonuses. The client may download 314 a portion of data from the mirror that was selected 312. As such, during the downloading 314 characteristic data of the mirror used in the downloading 314 may be obtained 306. In turn, the data obtained 306 may be used in assigning 308 quality values. Accordingly, the protocol 300 may comprise an iterative loop such that for each new portion of data that is downloaded 314 characteristics of the mirror used in the downloading 314 are obtained 306 and effect the assignment 308 of quality values. Accordingly, the protocol 300 involves dynamically reevaluating mirrors to determine which mirror represents optimal mirror from which to download data.

Figure 4:
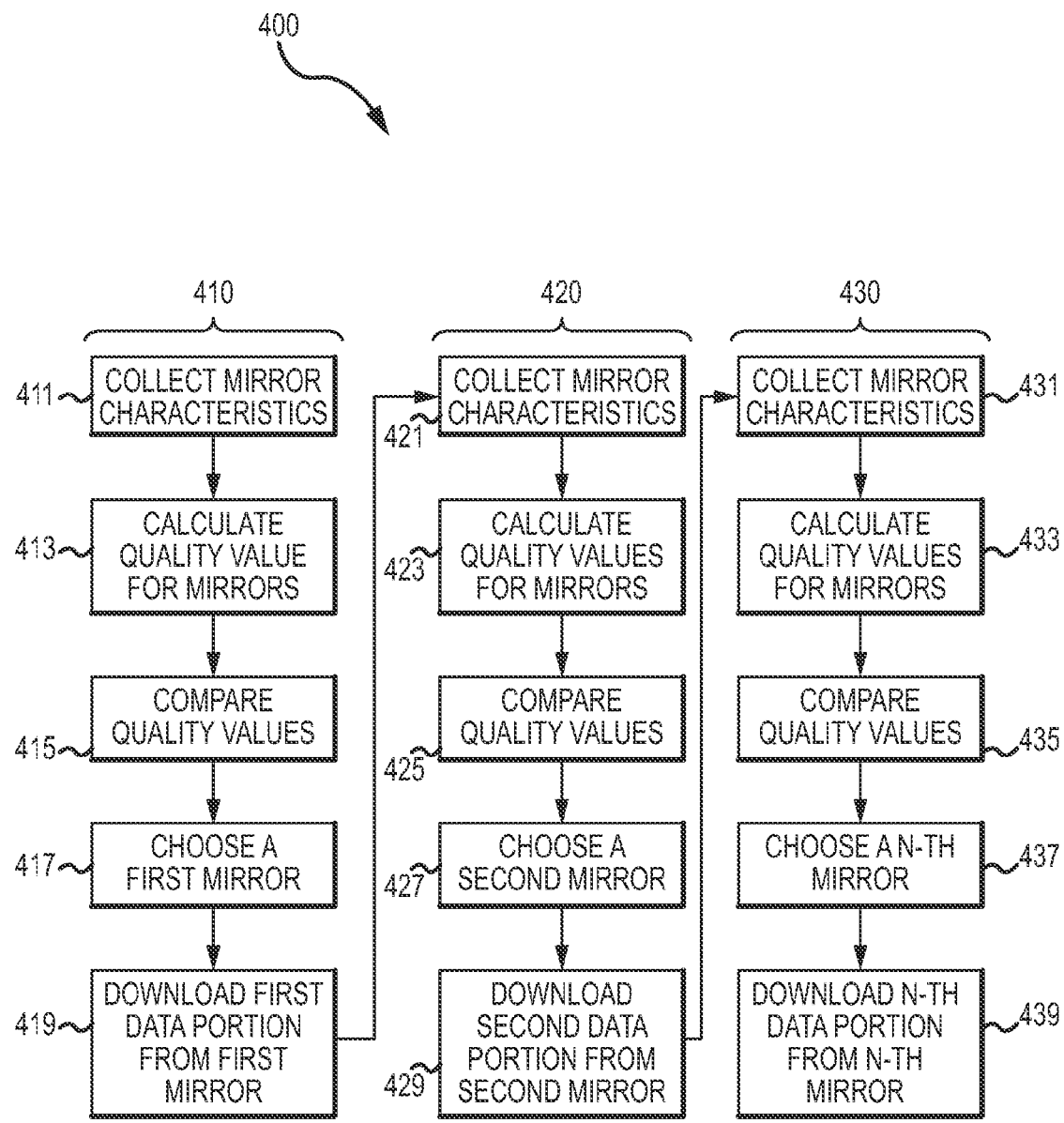
FIG. 4 is a flowchart depicting a process of dynamic intelligent mirror selection.

Turning now to FIG. 4, a process 400 of dynamic intelligent mirror selection is described. Column 410 generally depicts the portion of the process 400 used for intelligent mirror selection of a first mirror for downloading a first data portion from the first mirror. Column 420 generally depicts the portion of the process 400 used intelligent mirror selection of a second mirror for downloading a second data portion from the second mirror. It will be understood that the process may be repeated a number of times and column 430 may generally depict the portion of the process 400 using intelligent mirror selection of an n-th mirror for downloading an n-th data portion from the n-th mirror. In this regard, the process 400 may continue such that a data set that has been divided into n portions may be downloaded and upon completion of the download of each portion, the status of the mirrors may be evaluated to intelligently select a mirror used to download the next portion. It will be understood that not every mirror may be downloaded from. That is, while n data portions are downloaded, mirrors may be used more than once for different data portions such that less than n mirrors are used for downloading.

The process 400 may generally begin by collecting 411 mirror characteristics. The collecting 411 of mirror characteristics may include accessing stored characteristics that may have been obtained during the download of a previous data portion. Thus, the stored characteristics of each available mirror may be accessed to determine the characteristics of the available mirrors. Based on these previously observed mirror characteristics, the process 400 may include calculating 413 quality values for each available mirror. The calculated 413 quality values may be based on the collected 411 characteristics of the mirrors. The calculation 413 of quality values may be based on those characteristics as discussed above (e.g., mirror speed, error counts, latency, etc.). Furthermore, the calculation 413 may also include allotment of a random bonus and usage bonus to the available mirrors as described above.

The process generally proceeds such that quality values are compared at 415. Based on comparing 415 quality values, the process 400 may include choosing 417 a first mirror. Furthermore, the process 400 may include downloading 419 a first data portion from the first mirror. Thus, characteristics of the first mirror may be collected during the downloading 419 and added to the stored mirror characteristics such that the collecting 421 of stored mirror characteristics includes collecting characteristics observed during the downloading 419.

Thus, the obtaining 421 may take into consideration characteristics obtained relating to the first mirror during the downloading 419. The process 400 may further involve calculating 423 quality values for each of the available mirrors, based on the collected characteristics including the characteristics of the first mirror observed during the downloading 419. The quality values may be compared 425 and, based on the compared quality values, a second mirror may be chosen 427. In turn, a second portion of data may be downloaded 429 from the second mirror.

One of ordering skill in the art will understand that the process generally depicted in column 410 and column 420 of the flowchart 400 may be repeated a number of times such that a number of data portions may be downloaded from a number of mirrors such that the characteristics of the mirror used to download a previous data portion are collected 431 and used in calculating 433 the quality values in the process of selecting the mirror from which to download each next portion of data. In this respect, each subsequent downloading 439 of a data portion takes into consideration characteristics collected 431 from a mirror during the download of a previous data portion. Thus, if network conditions are altered or otherwise changed (e.g., the client moves in the network, the topology of the network is altered, the mirror experiences a problem, etc.), the change in the network conditions may be detected such an optimal mirror may continually be reselected for each next data portion.

While the invention has been illustrated and described in detail in the drawings and foregoing description, such illustration and description is to be considered as exemplary and not restrictive in character. For example, certain embodiments described herein above may be combinable with other described embodiments and/or arranged other ways (e.g., process elements may be performed in other sequences). Accordingly, it should be understood that only the preferred embodiment and variants thereof have been shown and described in all changes and modifications that come within the spirit of the invention are desired to be protected.

What is claimed is:

1. A method for downloading data to a client using dynamic intelligent mirror selection of mirrors from a plurality of mirrors in a network, the method comprising:

assigning, using a microprocessor at said client, a first quality value to each of said plurality of mirrors based on one or more characteristics regarding said plurality of mirrors, said one or more characteristics including, at least, a number of times a mirror has been used to download data to said client, wherein said quality value comprises a usage bonus based on said number of times a mirror has been used to download data to said client, wherein a mirror that has been used a fewer number of times receives a larger usage bonus than a mirror that has been used a greater number of times, wherein said plurality of mirrors comprise identical portions of data for downloading;

selecting a first mirror from said plurality of mirrors based on said first quality value of said first mirror;

first downloading a first portion of said data from said first mirror;

assigning, using a microprocessor at said client, a second quality value to each of said plurality of mirrors based on said one or more characteristics regarding said plurality of mirrors including one or more characteristics of said first mirror observed during said first downloading;

selecting at said client a second mirror from said plurality of mirrors based on said second quality value of said second mirror; and second downloading a second portion of said data from said second mirror.

2. The method of claim 1, wherein said one or more characteristics regarding said plurality of mirrors comprise characteristics of said plurality of mirrors observed during previous downloads of data from said plurality of mirrors.

3. The method of claim 2, wherein said assigning further comprises allotting each mirror of said plurality of mirrors a random bonus value, wherein said random bonus value provides disparity in quality values between similarly situated mirrors.

4. The method of claim 2, wherein said one or more characteristics comprise an error count, and wherein a mirror is penalized for each error in said error count.

5. The method of claim 4, wherein data errors are penalized more than transient network errors.

6. The method of claim 2, wherein said one or more characteristics comprises a mirror load value, and wherein said method further includes randomly penalizing a mirror once a threshold mirror load value is observed.

7. The method of claim 2, wherein said one or more characteristics comprises a transfer speed between a mirror and said client.

8. The method of claim 7, wherein said transfer speed comprises normalizing said speed of connection of a mirror with respect to a transfer speed of an origin.

9. The method of claim 2, wherein a decay value is applied to said one or more characteristics based upon an amount of time since said one or more characteristics were observed, and wherein said decay value is greatest for the oldest observed characteristics.

10. The method of claim 1 wherein once a mirror is used a predetermined number of times said usage bonus goes to zero.

11. The method of claim 1, wherein said first mirror and said second mirror are different.

12. The method of claim 1, wherein said method is repeated until all of said data is downloaded.

13. A computer-based system for downloading a data set using dynamic intelligent mirror selection of mirrors from a plurality of mirrors in a network, the system comprising:

an interface module operative to communicate with said plurality of mirrors;

a mirror characteristic storage module in operative communication with said interface module and operative to store, in a storage device, one or more characteristics of each of said plurality of mirrors based on observation of communication between said mirrors and said interface module said one or more characteristics including, at least, a number of times a mirror has been used to download data to said client;

a mirror quality calculation module, including a microprocessor, in operative communication with said mirror characteristic storage module and operative to calculate a quality value for each of said plurality of mirrors based on said one or more characteristics of said plurality of mirrors, wherein said calculating comprises allotting a usage bonus based on said number of times a mirror has been used to download data to said client, wherein a mirror that has been used a fewer number of times receives a larger usage bonus than a mirror that has been used a greater number of times; and a mirror comparison module in operative communication with said mirror quality calculation module to receive said quality values for each of said plurality of mirrors, wherein said mirror comparison module is operative to designate to said interface module a mirror selection of one of the plurality of mirrors based on said quality values of the plurality of mirrors from which said interface module is to download data;

wherein said computer-based system operates to dynamically update said mirror selection based on transient network conditions after downloading a portion of said data set.

14. The system of claim 13, wherein said mirror characteristic storage module is operative to store characteristics for said plurality of mirrors observed at a plurality of instances.

15. The system of claim 13, wherein said system is operative to download a plurality of data portions from a plurality of mirrors, and said mirror comparison module is operative to designate to said interface module a mirror selection after the download of each of said plurality of data portions.

* * * * *